United States Patent [19]

Braun

[11] 3,927,530

[45] Dec. 23, 1975

[54] SUPERCHARGED INTERNAL COMBUSTION ENGINE

[76] Inventor: Anton Braun, 6421 Warren Ave., Minneapolis, Minn. 55435

[22] Filed: May 28, 1974

[21] Appl. No.: 473,416

[52] U.S. Cl. .................................. 60/607; 60/609
[51] Int. Cl.² ...................................... F02B 33/44
[58] Field of Search ............ 60/605, 607, 608, 609, 60/447, 448; 123/119 C, 119 CE

[56] References Cited
UNITED STATES PATENTS

| | | | |
|---|---|---|---|
| 2,898,731 | 8/1959 | Barr | 60/607 |
| 2,968,914 | 1/1961 | Birmann | 60/608 |
| 3,036,563 | 5/1962 | Garcea | 123/119 CE |
| 3,355,879 | 12/1967 | Smith et al. | 60/608 |
| 3,389,554 | 6/1968 | Wolf | 60/608 |
| 3,473,322 | 10/1969 | Wolf | 60/607 |
| 3,603,079 | 9/1971 | Kickbusch | 60/608 |

Primary Examiner—Wendell E. Burns
Assistant Examiner—David D. Reynolds
Attorney, Agent, or Firm—Alan M. Staubly

[57] ABSTRACT

A supercharged internal combustion engine having an exhaust-driven turbocharger for supplying combustion air to the engine and auxiliary power means for additionally applying a driving force to the compressor under occasional and otherwise normally deficient combustion air conditions, to provide the desired amount of combustion air for proper combustion. The power means includes a hydraulic assist motor mechanically coupled with the turbocharger and a hydraulic pump connected by a fluid flow passageway with the motor and permanently coupled with a drive shaft of the engine. The pump is connected through a selector valve to the oil in the reservoir of the engine's crankcase or to the vapor chamber above the oil level in the reservoir or to the atmosphere.

The selector valve may be manually controlled or automatically controlled by a sensor responsive to one or more of such engine conditions as manifold air pressure, engine speed, etc. The valve may also have a bleed passageway therein that connects with the oil reservoir when the pump is pumping vapor or air to assure adequate lubrication for the pump and, if need be, the hydraulic motor.

14 Claims, 6 Drawing Figures

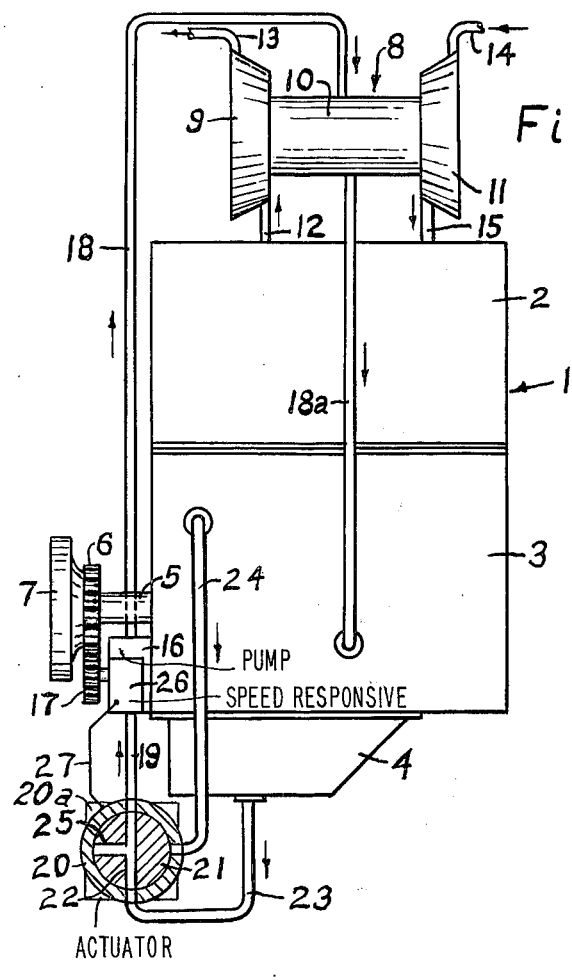
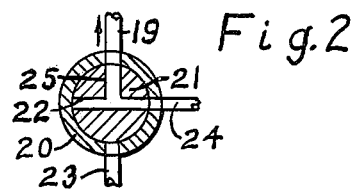
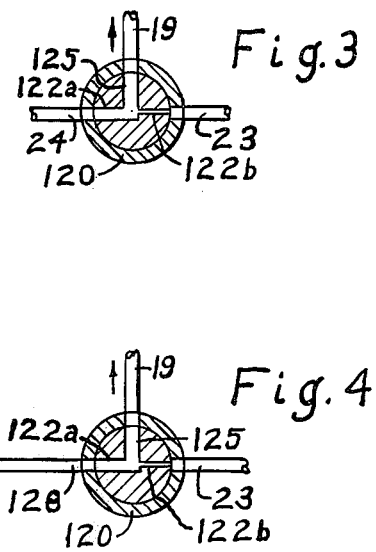
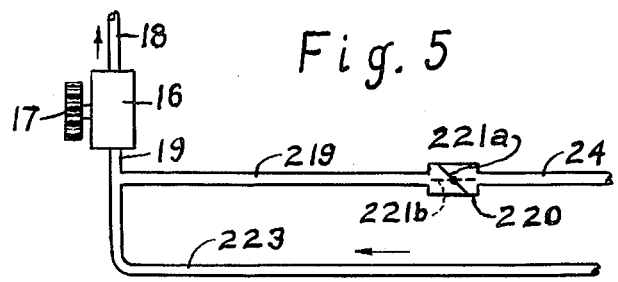
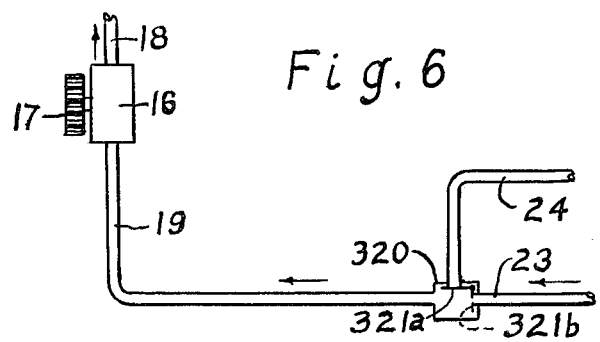

SUPERCHARGED INTERNAL COMBUSTION ENGINE

BACKGROUND OF THE INVENTION

In certain applications of hydraulic pumps and hydraulic motors in supercharged internal combustion engines it is necessary, or at least desirable, to switch off the hydraulic motor while the driver that drives the hydraulic pump is still operating. One specific example is an auxiliary turbocharger hydraulic assist motor which is temporarily switched on to accelerate the turbocharger at a substantially higher rate than would be possible by using the engine exhaust energy only for such acceleration. A substantial increase in engine acceleration is the result when, for instance, accelerating from a low speed-low load to a high speed-high load. Above a certain speed hydraulic assist may not be necessary since high exhaust energy of the engine at high speed may well be able, through the exhaust turbine, of the turbocharger to supply all the energy the compressor of the turbocharger needs at that point. Thus, any energy supplied to the turbocharger through the hydraulic assist motor would be poorly utilized and it would be desirable to switch off the hydraulic assist motor.

Many specific arrangements have been used to provide the above mentioned auxiliary air supply. One specific arrangement disclosed in a copending U.S. application of S. G. Timoney, Ser. No. 345,269 dated Mar. 27, 1973, suggests the use of an electromagnetic clutch which is arranged between the auxiliary power take-off of the main engine and the drive shaft of the hydraulic pump. During the periods where it is desirable or necessary to provide the turbocharger with more energy than the exhaust gases of the engine can provide, the electromagnetic clutch is engaged and the hydraulic pump is driven from the engine so that high pressure hydraulic fluid can be applied to the hydraulic assist motor, which is permanently coupled with the turbocharger and by receiving the additional energy from the hydraulic pump, helps to speed up the turbocharger and, in turn, the engine. While this arrangement is a useful, effective and rather simple one among a great number of more cumbersome or complex ones, it does require the use of an expensive clutch that may require frequent replacement.

Another arrangement, disclosed in Wolf U.S. Pat. No. 3,389,554 uses a hydraulic motor and a limited delivery pump that supplies sufficient oil to add power to the supercharger up to a certain speed. Thereafter air or oil vapor is permitted to enter the line between the pump and the motor. However, in each of the three illustrated embodiments of the Wolf invention, the pump constantly pumps oil and, therefore, unnecessarily uses energy and causes wear.

SUMMARY OF THE INVENTION

The present invention provides a hydraulic switching arrangment for a hydrodynamic motor driven device for supplying condition altering means to a power generator. The generator, when operating, constantly drives a hydraulic pump which has an outlet connected to the inlet of the motor. A reservoir, partially filled with liquid, has a space above the liquid which is filled with vapor or gas. Valve means and conduits are so connected to the inlet of the pump and the reservoir, above and below the liquid level therein that in one selected position of the valve means, the pump will deliver liquid to the motor to supply power to its driven device and, in another selected position of the valve means, the pump will deliver vapor or gas to the motor so as to deliver substantially no power to the driven device. The valve means may be manually actuated or automatically actuated by means responsive to a condition of the power generator. The invention requires no clutch and reduces wear and power loss present in prior art arrangements.

BRIEF DESCRIPTION OF THE DRAWINGS

FIG. 1 is a schematic drawing of the invention;

FIG. 2 is a similar view of the selector valve only of FIG. 1 with the valve in its alternate position;

FIG. 3 is a similar view of a modified form of a selector valve;

FIG. 4 illustrates the valve of FIG. 3 connected to a conduit leading to the atmosphere;

FIG. 5 is a schematic view of a modified selector or control valve and fluid flow conduits arrangement for the engine of FIG. 1; and FIG. 6 is a view similar to FIG. 5 showing a still further selector valve and conduits arrangement.

DETAILED DESCRIPTION

Referring to FIG. 1, an internal combustion engine is generally designated by the reference numeral 1 and includes a cylinder block portion 2, crankcase portion 3 and oil reservoir portion 4. A crankshaft 5 extends outwardly from the portion 3 and carries a gear 6 and flywheel 7.

Suitably mounted on the engine, is a supercharger, generally designated by the reference numeral 8, which includes an exhaust driven turbine 9, a hydraulic motor 10 of the hydrodynamic type and an air compressor 11, all preferably on a common drive shaft (not shown). Exhaust gases pass through pipe 12 to turbine 9 and through pipe 13 to the atmosphere. It provides the main driving power for the compressor. Air enters the compressor through pipe 14 and flows to the engine through pipe 15.

Auxiliary power is supplied to the compressor by a hydraulic pump 16 having a gear 17 that meshes with the engine driven gear 6. A conduit or pipe 18 delivers oil from the pump to motor 10. Pipe 18a returns the oil to the reservoir through the crankcase. A pipe 19 extends from the inlet of pump 16 to a selector or control valve 20. A rotary valve element 21 (disk, plug or piston) has a diametric passageway 22 therein that registers with the pipe 19 and a pipe 23, connected to the oil reservoir, in one position of the element. Passageway 22 registers with a pipe 24 between the valve 20 and crankcase portion 3 and the center of passageway 22 through a branch passageway 25, with pipe 19 in the valve element position shown in FIG. 2. It is therefore seen that the valve 20 would deliver oil to pump 16 in FIG. 1 and would deliver air and/or oil vapor to the pump in the FIG. 2 position. Thus, in the FIG. 2 position, a negligible amount of energy is taken from the engine by the pump. While the position of element 21 may be manually controlled in a conventional manner, it may also be automatically controlled by an engine condition responsive means that will move the valve element to the FIG. 1 position, to supply oil to the pump and motor 10, when additional air is needed for proper conbustion and to the position of FIG. 2, to supply vapor to the pump and motor when no additional air is needed. One such automatic means could be a conventional engine speed responsive means 26, electrically connected by wire 27 to a suitable electric actuator.

Operation

FIG. 1 illustrates the engine in an operating condition wherein there is a need for additional combustion air. The valve is therefore in the position to permit pump 16 to deliver oil to motor 10 to apply more power to compressor 11. After the engine speed has increased sufficiently to enable the engine exhaust to drive the compressor fast enough to supply all the air needed for proper combustion, the valve may be manually or automatically moved to the position of FIG. 2 as explained above.

Should it be found desirable to provide additional lubrication for the pump when the motor is not delivering auxiliary power to the compressor, the selector valve may have the construction shown in FIG. 3 of the drawing. In this embodiment the valve body 120 has the oil pipe 23 entering it from the side opposite pipe 24 and a diametric passageway has a full size portion 122a registering with pipe 24 and a bleed size portion 122b registering with pipe 23 to permit only a small amount of oil to be drawn through pump 26 to lubricate it. Passageway 125 is similar to 25 of FIG. 1.

Should the pump need no lubrication, the valve of FIG. 1 would be connected to the atmosphere through pipe 24 rather than to the crankcase. Should only a small amount of oil be desired for lubrication purposes, the valve of FIG. 3 would be connected to the atmosphere, through a pipe 128 with a fixed or adjustable orifice 129 therein, as illustrated in FIG. 4, rather than to the crankcase.

FIG. 5 Modification

A modified form of the switching part of the invention is illustrated in FIG. 5 of the drawing. It differs from the apparatus of FIG. 1 in that a pipe 223 is substituted for the pipe 23 and extends between pipe 19 and the reservoir, and a branch pipe 219 and an on-off valve 220 extends between pipe 19 and pipe 24. The on-off valve may be of the butterfly type and is illustrated as being in its closed position at 221a. When valve 220 is open, pump 16 pumps vapor only as it offers less resistance to pumping than the oil. When the valve is closed, only oil is pumped.

FIG. 6 Modification

In FIG. 6, a two-way flapper type selector valve 320 or any other equivalent type, replaces the valve 20 between pipes 19, 24 and 23. A manually or automatically actuated pivoted flapper valve 320 in position 321a closes vapor pipe 24 when oil is being pumped and closes pipe 23 in position 321b when vapor is being pumped.

The basic operation and functioning of each of the various illustrated modifications is the same as in the preferred embodiment of FIG. 1. Each provides a reliable inexpensive low pressure control apparatus in a hydraulic energy system which utilizes a minimum amount of energy. The invention can also be used to supply cooling air to an electric generator or motor, constantly driving a hydraulic pump as in the preferred embodiment described above, by having the valving means respond to an overheating condition of the generator or motor. As still other modifications or uses of the invention may be made without departing from the spirit thereof, the scope of the invention should be determined from the following claims.

I claim:

1. Hydraulic switching apparatus for a hydraulic motor driven device for delivering condition altering means to a power generator comprising a hydraulic pump that is connected to and constantly driven by said generator when said generator is operating, a first fluid flow passageway between said pump and the hydraulic motor of said device, a selector valve having an outlet connected to said pump, a reservoir with liquid therein and having a chamber above the liquid and containing gas or vapor, a second fluid flow passageway extending from said pump and arranged to receive liquid from the reservoir from a point below the level of the liquid therein, a third fluid flow passageway extending between said valve and said chamber above said liquid, valving means in said valve that in one position thereof permits liquid to flow therethrough to said pump and in another position thereof permits vapor or gas to flow to said pump so as to prevent liquid flow to the pump, and means for moving said valving means to and from said positions.

2. Hydraulic switching apparatus as defined in claim 1 wherein the motor of said device is of the hydrodynamic type.

3. Hydraulic switching apparatus as defined in claim 1 wherein said power generator is an internal combustion engine.

4. The apparatus of claim 1 wherein said valving means has conduits therein that in one position thereof connects the first and second passageways and in another position thereof connects said first and third passageways.

5. The apparatus of claim 4 wherein said valving means has a bleed passageway therein that connects said first and second passageways when said first and third passageways are connected.

6. Apparatus as defined in claim 1 wherein said means for moving said valving means includes means responsive to a condition of the power generator.

7. Apparatus as defined in claim 1 wherein said power generator is an internal combustion engine and said means for moving said valving means includes means responsive to an engine condition indicative of a need for additional combustion air.

8. In a supercharged internal combustion engine having an exhaust driven turbocompressor, the combination comprising an auxiliary hydrodynamic motor permanently connected to said compressor, a hydraulic pump connected by a conduit with said motor and having a permanent connection to a power shaft of said engine, a liquid containing reservoir for supplying liquid to said pump, hydraulic switching apparatus including valve means controlling first, second and third fluid flow passageways respectively connected to an inlet of said pump and to a passageway to the liquid containing portion of said reservoir and to a space containing vapor or gas, a movable valve member in said valve means for selectively enabling said pump to pump either liquid from said reservoir or vapor or gas from said space containing vapor or gas, and means for moving said valve member between selective positions.

9. An engine as defined in claim 8 wherein said space is a space over oil in said reservoir and normally contains oil vapor.

10. The combination of claim 8 wherein said valve means has a rotatable valve member with passageways therein that in one position connects said first and second passageways for pumping oil to add power to the compressor and in another position connects said first and third passageways for pumping vapor to effectively add no power to the compressor.

11. The combination of claim 10 wherein said valve member has a bleed passageway therein that connects the first and second passageways for a limited amount of oil flow for lubrication purpose only when the valve member has the first passageway connected to the third passageway.

12. The combination of claim 8 wherein said valve member is an on-off type of valve positioned in the third passageway.

13. An engine as defined in claim 8 wherein said means for actuating said valve member is responsive to an engine condition.

14. An engine as defined in claim 13 wherein said engine condition responsive means senses an engine condition indicative of the engine's air requirement.

* * * * *